(12) United States Patent  
Vosbikian (10) Patent No.: US 7,798,099 B2
(45) Date of Patent: Sep. 21, 2010

(54) MODULAR BIRD FEEDER SYSTEM (75) Inventor: Peter S. Vosbikian, Moorestown, NJ (US)

(73) Assignee: Zenith Innovation, LLC, Delran, NJ (US)

( * ) Notice: Subject to any disclaimer, the term of this patent is extended or adjusted under 35 U.S.C. 154(b) by 147 days.

(21) Appl. No.: 12/228,108

(22) Filed: Aug. 8, 2008

(65) Prior Publication Data

US 2010/0031890 A1 Feb. 11, 2010

(51) Int. Cl.
*A01K 39/012* (2006.01)
(52) U.S. Cl. ..................... 119/52.3; 119/52.2
(58) Field of Classification Search .......... 119/52.3, 119/52.1, 52.2, 57.8, 57.9, 429, 468, 469
See application file for complete search history.

(56) References Cited

U.S. PATENT DOCUMENTS 5,406,908 A * 4/1995 Burleigh .................... 119/57.8
5,410,986 A * 5/1995 Washam .................... 119/52.2
6,253,706 B1 * 7/2001 Sloop ........................ 119/57.9
6,401,658 B1 * 6/2002 Teets ......................... 119/57.9

* cited by examiner

*Primary Examiner*—Yvonne R. Abbott
(74) *Attorney, Agent, or Firm*—Stuart M. Goldstein (57) ABSTRACT

A modular bird feeder system has a plurality of different modular bird feeder components which can be interchangeably connected based on user preference. All components are slideably mounted on a vertically standing pole. The slideable components include a feed filling funnel, an upper feed tray, a lower feed tray, a squirrel guard, and a feeder unit position adjustment handgrip which controls the upward and downward movement along the pole of the integral bird feeder unit which is assembled. An adjustable locking pin extending from the pole is used to maintain the bird feeder unit in the uppermost bird feeding position on the pole, regardless of which components are being used. When the pin is removed, the handgrip facilitates control of the bird feeder unit as it slides from its bird feeding position to a user-friendly, convenient feed filling position on the pole.

22 Claims, 8 Drawing Sheets

MODULAR BIRD FEEDER SYSTEM

BACKGROUND OF THE INVENTION

Bird feeders are often equipped with a variety of different components to accommodate different needs, uses, and desires. For instance, feeders routinely have perches on which birds stand during feeding, but sometimes additional perches for larger birds are required or wanted. Certain feeders have squirrel and other small animal guards for situations in which it is necessary to prevent intrusion by these animals. There is, however, currently no bird feeder which is readily adaptable to permit bird feeder components to be interchangeable, i.e. to be added or removed from the feeder, depending on user desire or specific need.

Additionally, pole mounted bird feeders are usually positioned at a height which makes it difficult for the normal sized individual to refill the feeder. Step stools or small ladders are often used to awkwardly fill empty feeders, presenting a bother, if not a real danger to the user. Ease of filling feeders without loss of bird food being poured into the feeder's storage compartment is also a problem which is encountered when attempting to replenish a feeder.

SUMMARY OF THE INVENTION

It is thus the object of the present invention to address and solve the disadvantages and limitations of prior bird feeders.

It is an object of the present invention to provide a modular bird feeder system which has a plurality of compatible, but different, interchangeable, modular bird feeder components.

It is another object of the present invention to provide a modular bird feeder system which has a plurality of modular bird feeder components which can be readily connected and disconnected, according to the needs and desires of the user.

It is a further object of the present invention to provide a modular bird feeder system which allows the interchangeable use of several, all, or none of its available modular bird feeder components, by providing for quick and effective connections between components.

It is still another object of the present invention to provide a modular bird feeder system which is easily and safely filled with bird food.

It is an object of the present invention to provide a modular bird feeder system which allows the height of the bird feeder itself to be adjusted, for convenient and safe filling of the bird feeder unit itself.

It is still a further object of the present invention to provide a modular bird feeder system which provides an efficient and wasteless bird feed filling component which is integral with the system.

These and other objects are accomplished by the present invention, a modular bird feeder system which comprises a plurality of different modular bird feeder components which can be interchangeably connected based on user preference or need. All components are slideably mounted on a vertically standing pole. The slideable components include a feed filling funnel, an upper feed tray, a lower feed tray, a squirrel guard, and a feeder unit position adjustment handgrip which controls the upward and downward movement along the pole of the integral bird feeder unit which is assembled. An adjustable locking pin extending from the pole is used to maintain the bird feeder unit in the uppermost bird feeding position on the pole, regardless of which components are being used. When the pin is removed, the handgrip facilitates control of the bird feeder unit as it slides from its bird feeding position to a user-friendly, convenient feed filling position on the pole.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 5:
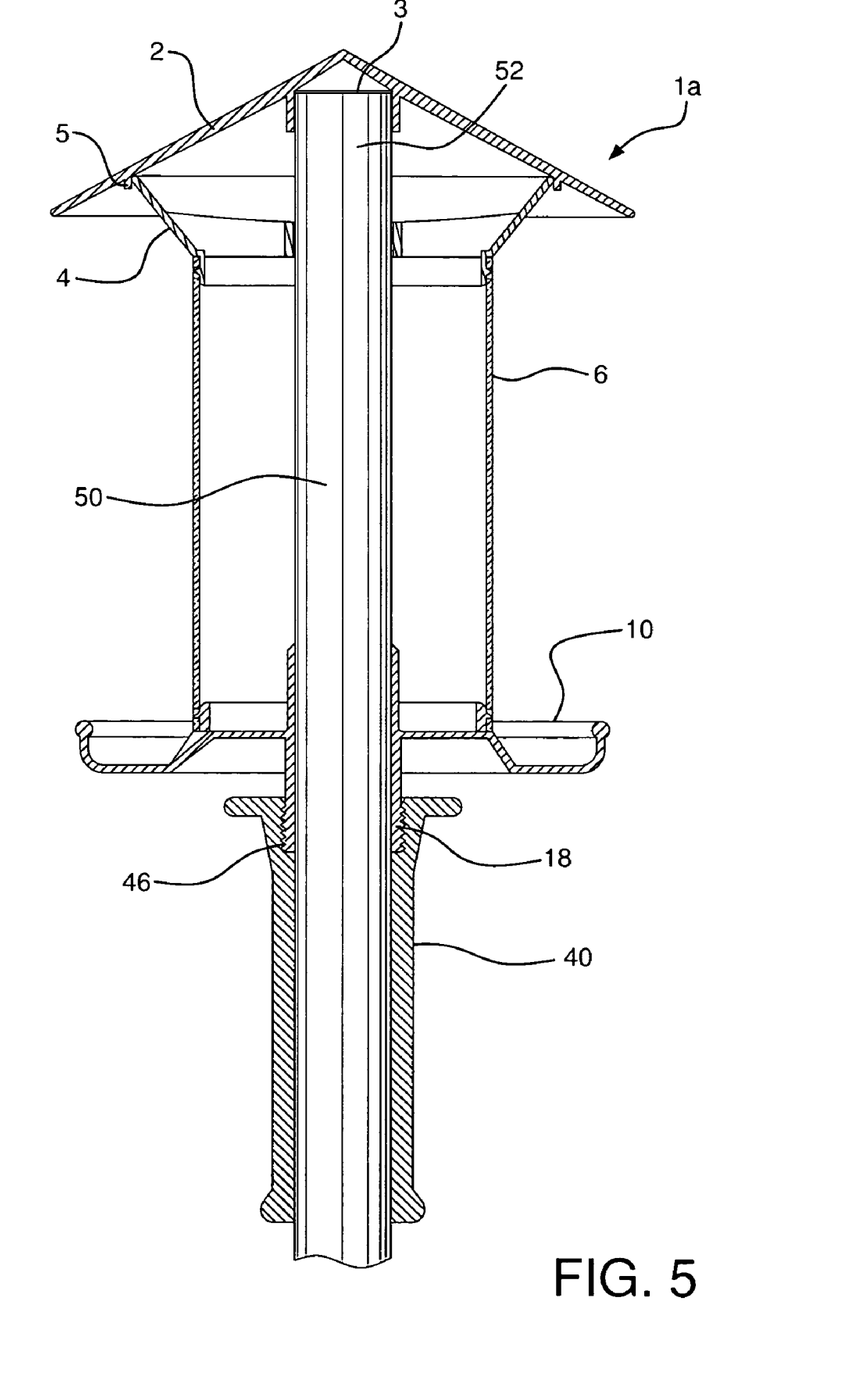
FIG. 5 is a cross-section view of the basic bird feeder unit configuration of the present invention.
Figure 7:
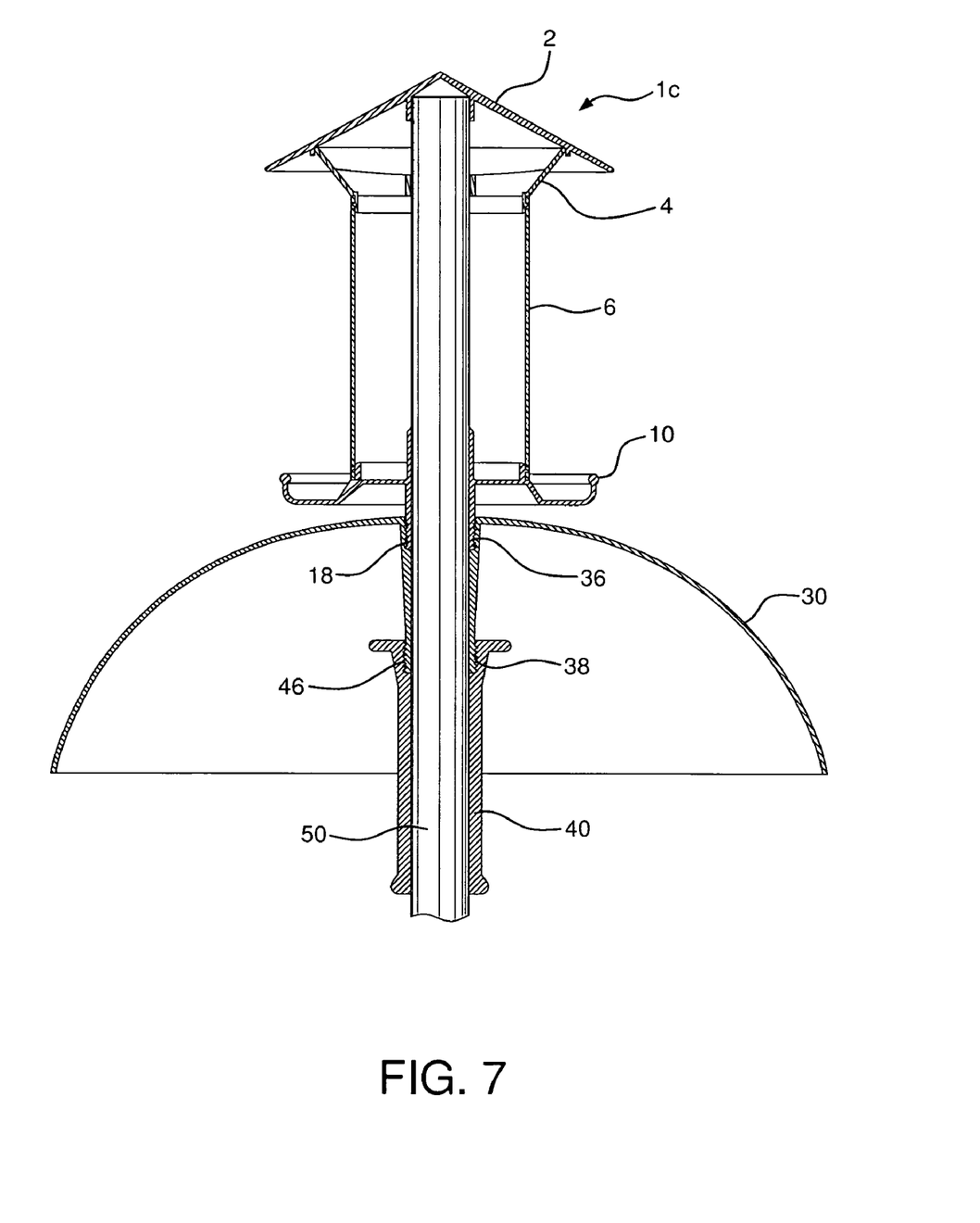
FIG. 7 is a cross-section view of still another bird feeder unit configuration of the present invention.
Figure 8:
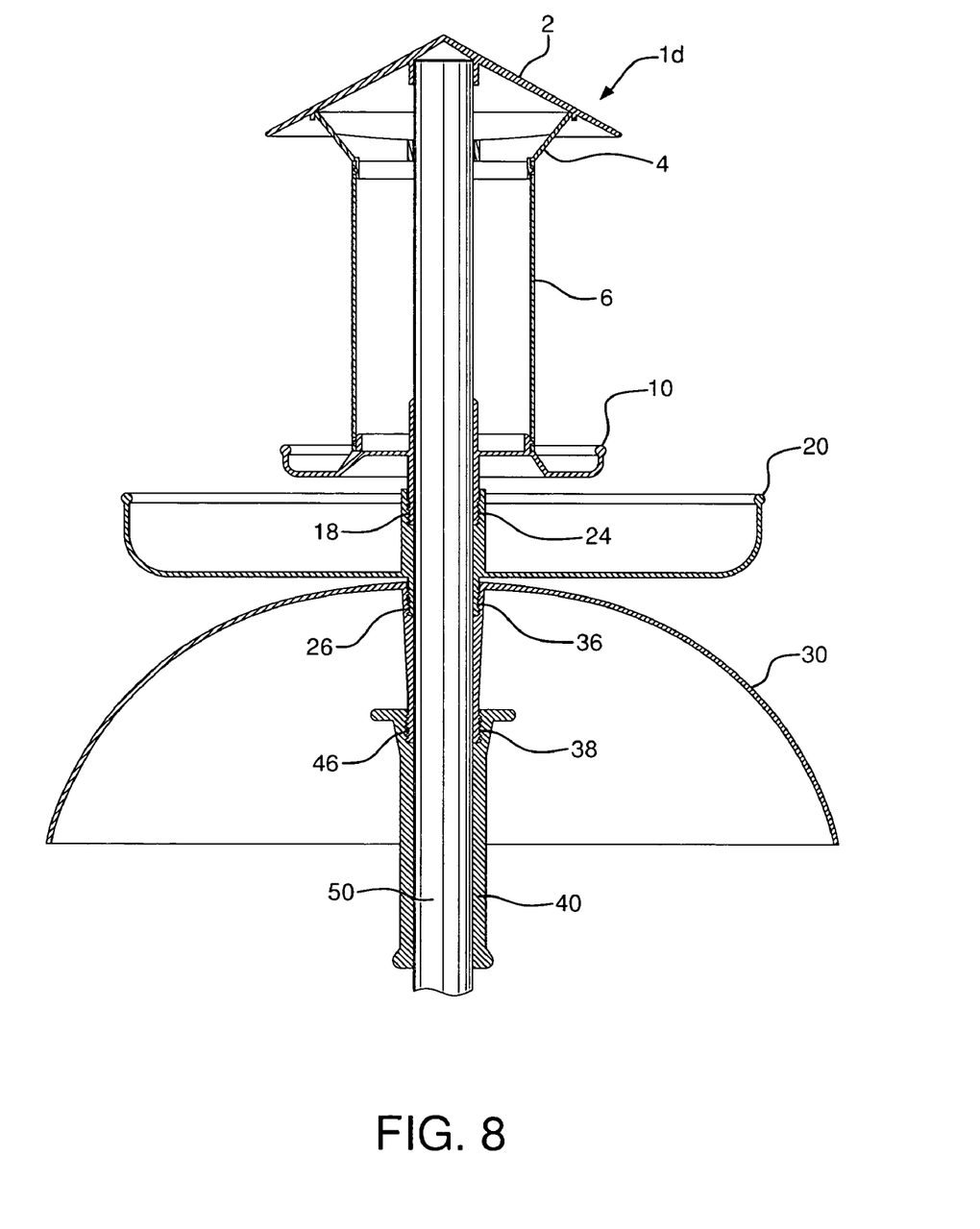
FIG. 8 is a cross-section view of a further bird feeder unit configuration of the present invention.

The bird feeder system of the present invention comprises a number of separable, modular components which are configured to be conveniently assembled to form various integral bird feeder unit configurations 1a (FIG. 5), 1b (FIG. 6), 1c (FIG. 7), and 1d (FIG. 8). Roof 2, comprising pole guide compartment 3, is removeably positioned on filling funnel 4, which itself is designed to mate with feed housing tube 6. As best seen in FIG. 5, ring 5 is attached to and extends completely around the underside of roof 2. Roof 2 is configured to be positioned on filling funnel 4, inboard of ring 5, in order to prevent the ingress of weather elements, such as water and wind, into the filling funnel and hence into feed housing tube 6. It is contemplated that housing feed tube 6 will be constructed of plastic or similar material, and, if of clear material, to permit visual observation of bird feed levels. Feed housing tube 6 is shown as being cylindrical in shape, with open space 8. However, the shape and configuration of this component as well as roof 2 is not to be considered restricted to that which is disclosed. Any convenient or desired shaped feed housing container or roof can be used.

Housing feed tube 6 is in turn placed on upper feed tray 10. Feed tray 10 comprises center tube support 12 with through channel 13. Upper section 14 of center tube support 12 is configured to extend into feed housing tube 6, the lower section 16 having threaded connection 18. Small bird feeding platform 19 extends from tube support 12. Threaded connection 18 of upper feed tray 10 is configured to be threadably mated with any of the threaded connections of the other module components of the invention: lower feed tray 20, squirrel guard 30, and feeder position control handgrip 40.

Figure 1:
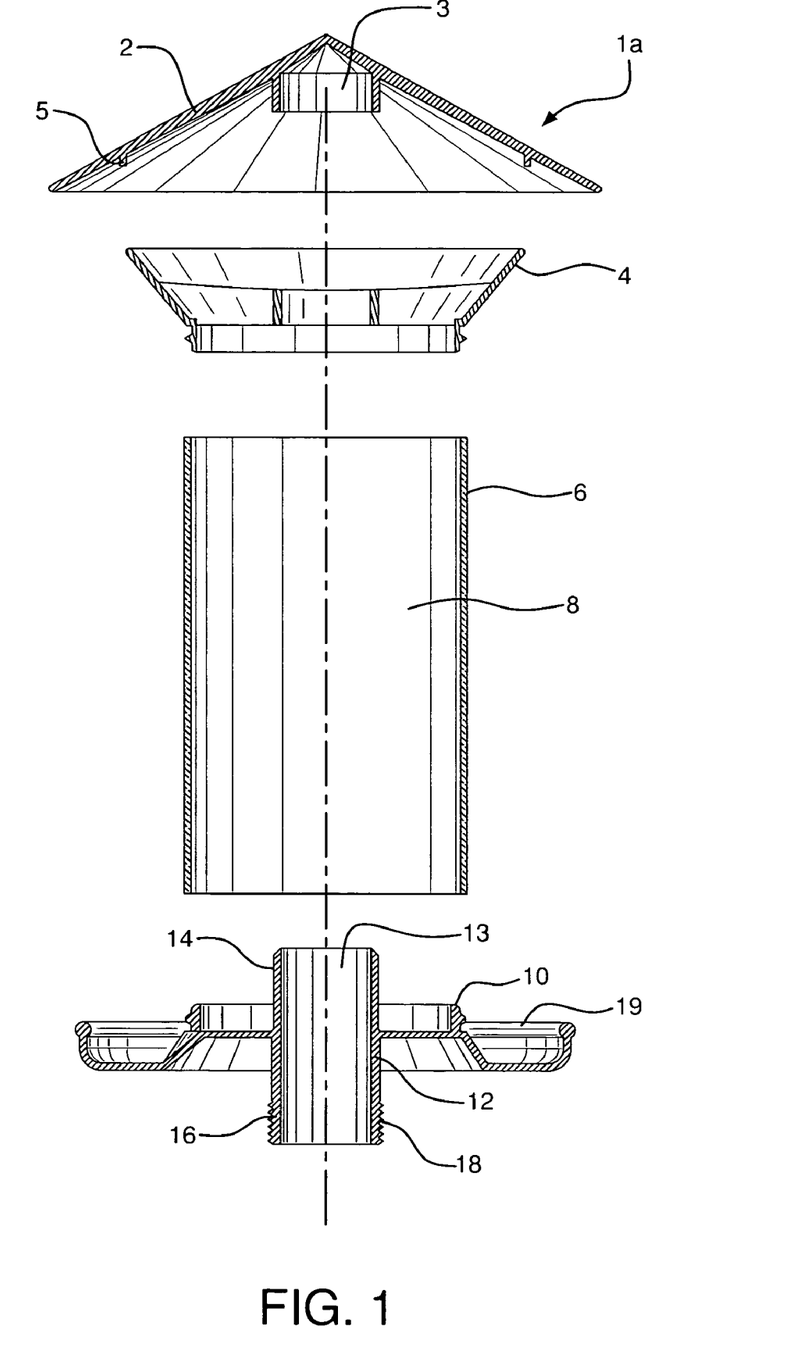
FIG. 1 is an exploded cross-section view of the basic upper components of the bird feeder system of the present invention.
Figure 2:
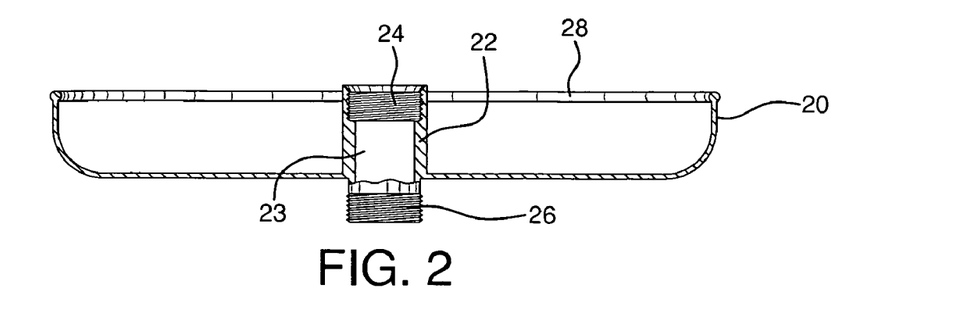
FIG. 2 is a cross-section view of the lower feed tray of the present invention.

Lower feed tray 20 comprises center tube support 22 with through channel 23, upper threaded connection 24 and lower threaded connection 26. Large bird feeding platform 28 extends from tube support 22.

Figure 3:
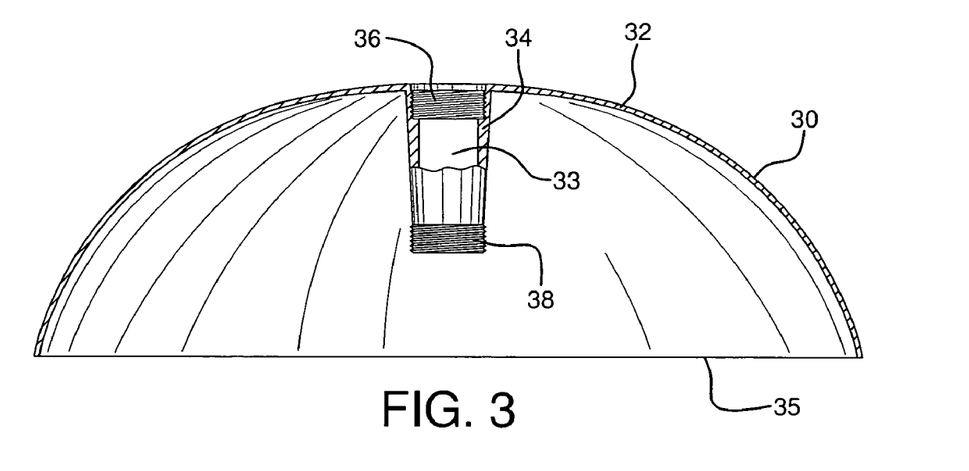
FIG. 3 is a cross-section view of the squirrel guard of the present invention.

Squirrel guard 30 comprises concave, curvilinear protective shell 32, which has open bottom 35. Center tube support 34 has through channel 33, upper thread connection 36, and lower thread connection 38.

Figure 4:
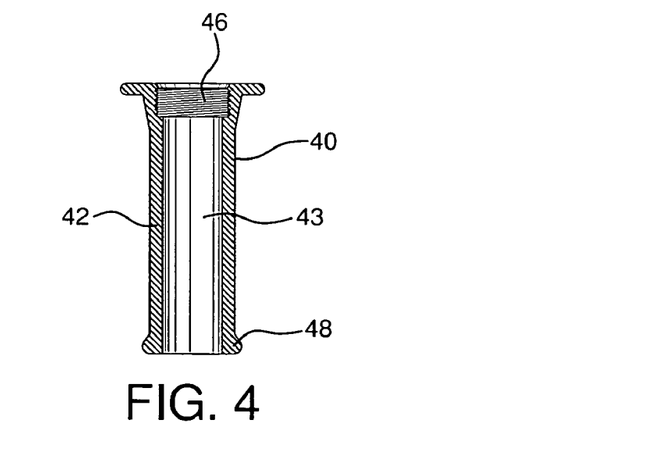
FIG. 4 is a cross-section view of the control handgrip of the present invention.

Feeder unit position adjustment control handgrip 40 comprises elongated tube 42 open at each end and sized for grasping by a user. Channel 43 extends through handgrip 40. Threaded connection 46 is located at the upper end of handgrip 40 and flared base section 48 is located at the lower end.

Elongated mounting pole 50 is configured to be vertically standing, secured within a ground foundation, as is common in the art. Pole 50 is designed to extend through channel 43 of handgrip 40, channel 33 of center tube 34 of squirrel guard 30, channel 23 of center tube 22 of lower feed tray 20, channel 13 of center tube support 12 of upper feed tray 10, housing feed tube 6, and feed filling funnel 4. Roof 2 rests on upper end 52 of pole 50, the upper end being positioned within pole guide compartment 3 extending down from the roof. Locking pin 54 is configured to extend through pole 50, to maintain the bird feeder 1 on the pole in its uppermost bird feeding position, as is described hereinafter.

Figure 9:
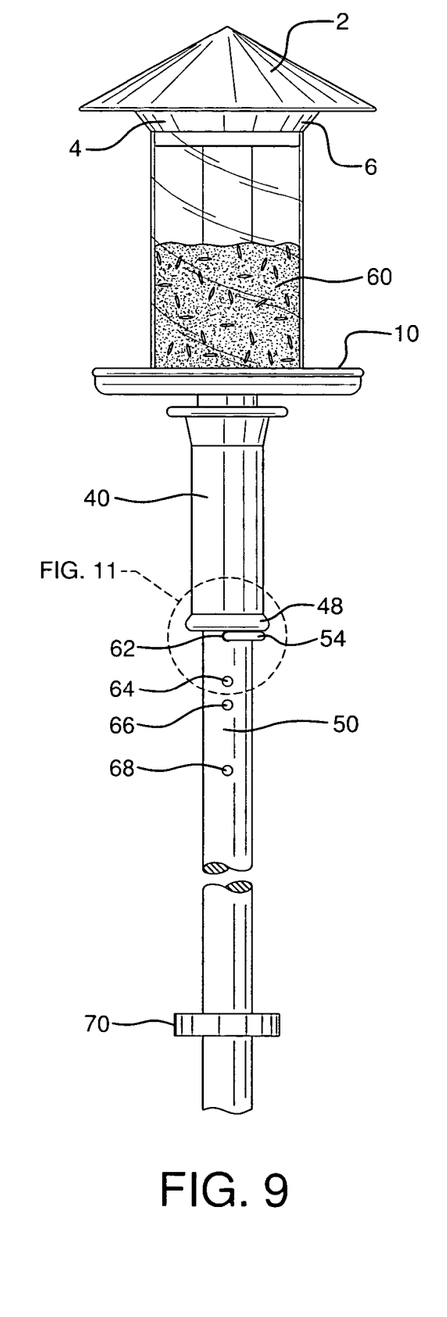
FIG. 9 is a view of the bird feeder system of the present invention in the bird feeding position.

An integral bird feeder unit of the bird feeder is formed by the assembly of different modular components. For instance, FIG. 5 shows basic, integral bird feeder unit 1a, with roof 2, filling funnel 4, housing feed tube 6, upper feed tray 10, and central handgrip 40, connected and fully assembled around pole 50. FIG. 9 shows this particular bird feeder unit mounted in its uppermost, bird feeding position on pole 50. Bird feed 60 fills housing feed tube 6. In this configuration, threaded connection 46 of handgrip 40 is threadably mated with threaded connection 18 of upper feed tray 10, as shown in FIG. 5. Bird feeder unit is maintained in this uppermost position on the pole by locking pin 54 through pole 50.

Figure 11:
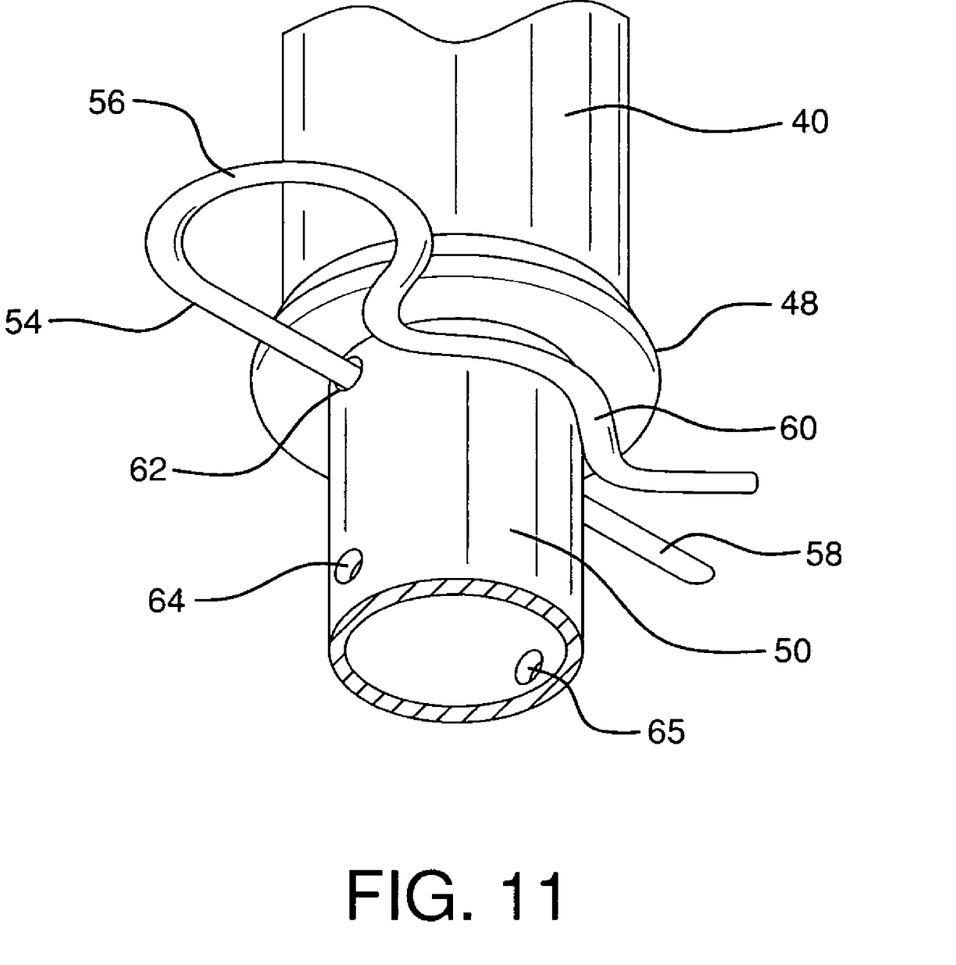
FIG. 11 is a view of the locking pin configuration of the invention.

Locking pin 54 comprises finger section 56 which interconnects elongated arm section 58 with pole cradle section 60. There is resiliency between sections 58 and 60 which permits these sections to spread apart when a force is applied between them. Elongated arm section 58 is configured to be inserted through holes located through pole 50. FIG. 9 shows holes 62, 64, 66, and 68 on one side of pole 50. Another set of four holes corresponding to these holes, and immediately across from them, is located on the other side of pole 50. See also FIG. 11, showing hole 64 and opposite, corresponding hole 65.

Once the assembled bird feed unit, for instance the unit shown in FIG. 9, is slideably raised up to its desired height by means of position adjustment control handgrip 40, locking pin 54 is inserted into hole 62 and opposite, corresponding hole. As locking pin 54 is being so inserted, arm section 58 and pole cradle section 60 are pushed against the surface of pole 50, as the pole is forced between these sections. The resiliency between arm section 58 and pole cradle section 60 causes the two sections to spread apart to accept and then close to maintain pole 50 between the sections. Once locking pin 54 is fully inserted into hole 62 and its opposite hole, the locking pin is secured within the pole. Base 48 of control handgrip 40 can then rest atop locking pin 54 and the bird feeder unit is maintained in this uppermost position on the pole.

Figure 10:
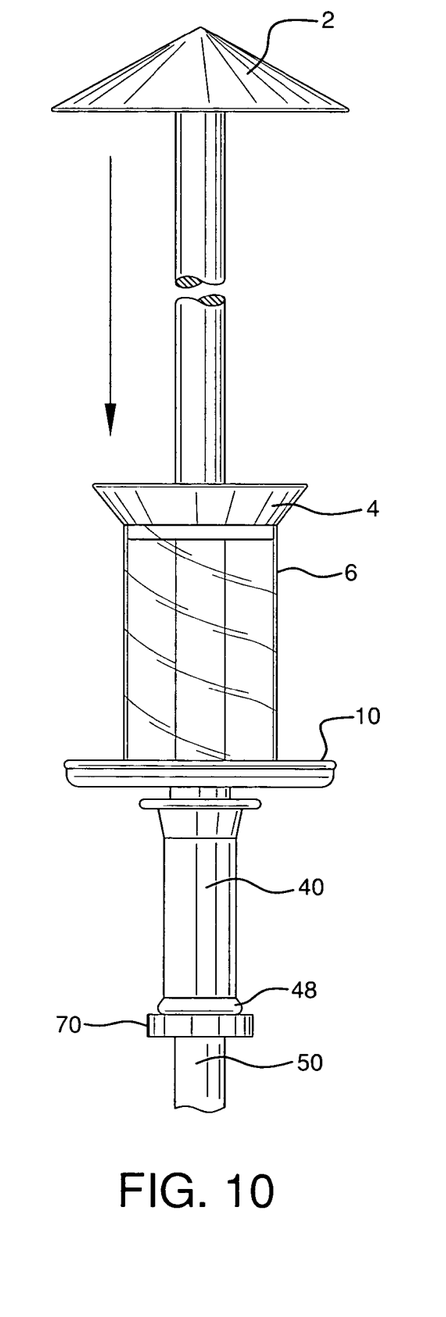
FIG. 10 is a view of the bird feeder system of the present invention in the feed filling position.

When it is necessary to fill the bird feeder unit with feed, finger section 56 makes it easy to remove locking pin 54 from pole 50. This allows all components of the bird feeder unit, except roof 2 which remains positioned on pole 50, to slide down the pole, until control handgrip 40 reaches fixed stop support 70, secured around the pole. See FIG. 10. Base 48 of control handgrip 48 then rests on stop support 70 to maintain the bird feeder unit in this position on pole 50. Stop support 70 can be a circular washer permanently attached around pole 50, or equivalent stop component, large enough to support base 48 of control handgrip 40. Stop support 70 is located on pole 50 at a height which allows comfortable filling of the bird feeder unit such that, in this position, feed can easily be added to housing feed tube 6, via filling funnel 4. It is contemplated that this position will place filling funnel 4 at a height adjacent to the waist of an individual of average height.

When the feed filling operation is completed, the bird feeder unit is simply slid up pole 50 to the uppermost position on the pole. Locking pin 54 is then inserted into the holes in the pole which maintain the bird feeder unit at this desired height.

Another significant novel advantage of the bird feeder system of the invention is that it allows the ability to add and mix and match different modular components, depending on user preference. While bird feeder unit 1a can be used solely with upper feed tray 10, as shown in FIG. 5, the bird feeder unit can also comprise lower feed tray 20 and/or squirrel guard 30, each easily and interchangeably added.

Figure 6:
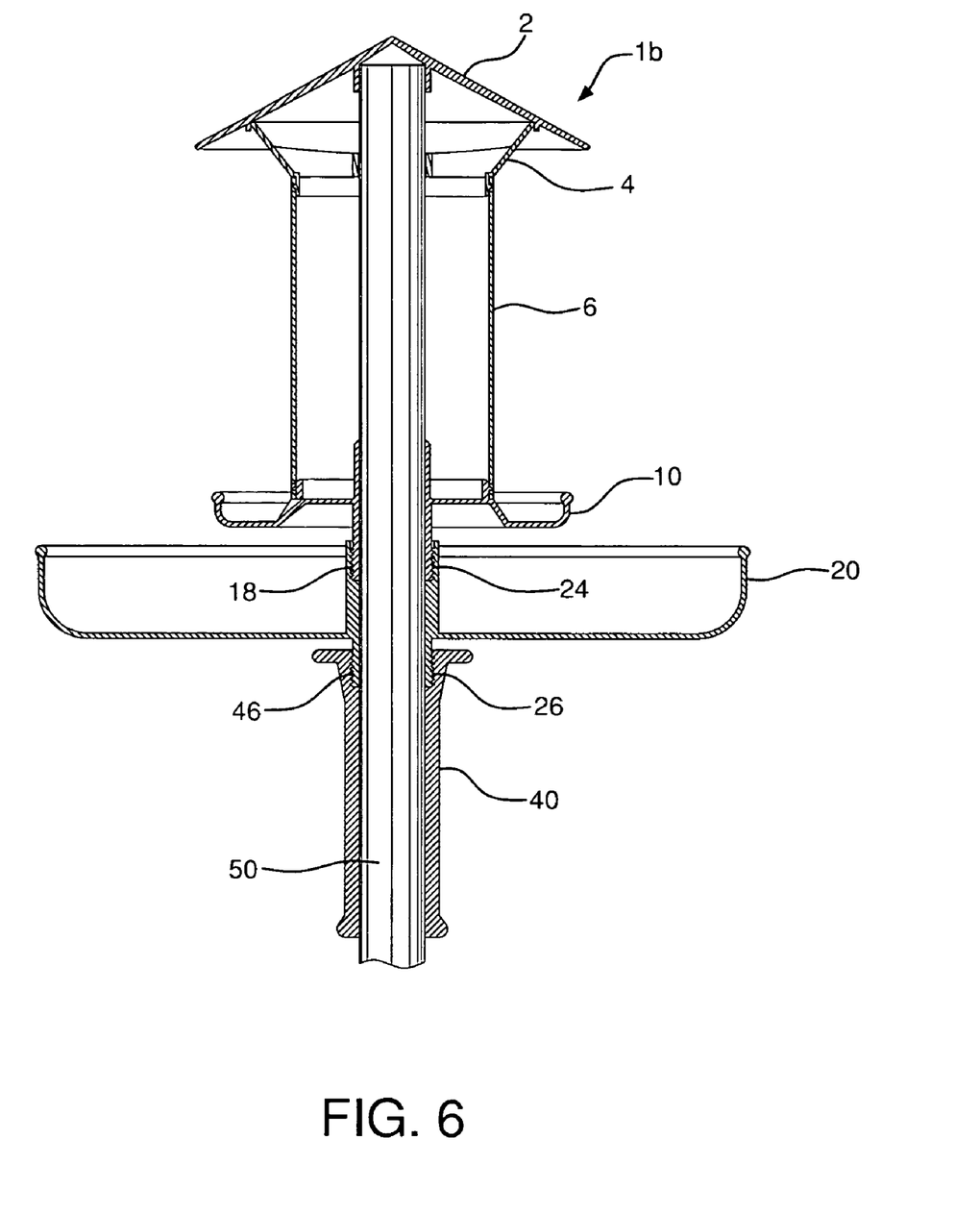
FIG. 6 is a cross-section view of an alternate bird feeder unit configuration of the present invention.

For example, FIG. 6 shows bird feeder unit 1b, with the inclusion of lower feed tray 20 connected at its upper threaded connection 24 to threaded connection 18 of upper feed tray 10 and at its lower threaded connection 26 to threaded connection 46 of handgrip 40. FIG. 7 shows bird feeder unit 1c, with squirrel guard 30 connected at its upper threaded connection 36 to threaded connection 18 of upper feed tray 10, and its lower threaded connection 38 connected to threaded connection 46 of handgrip 40. FIG. 8 shows bird feeder unit 1d with all available modular components in use, upper feed tray 10 being connected at threaded connection 18 to lower feed tray 20 at its connection 24, the lower feed tray being connected at its threaded connection 26 to squirrel guard 30 at its connection 36, and the squirrel guard in turn connected at its connection 38 to handgrip 40 at its connection 46.

Adding components to the assembled bird feeder unit increases the length of the overall unit. This added length of the bird feeder unit on pole 50 is accommodated by adjusting the position of locking pin 54 through the pole. When configured as in FIG. 6, bird feeder unit 1b is maintained in position on pole 50 by locking pin 54 through hole 64 and its corresponding opposite hole 65. When configured as in FIG. 7, bird feeder unit 1c is maintained in position on pole 50 by locking pin 54 through hole 66 and its corresponding opposite hole. And when configured as in FIG. 8, bird feeder unit 1d is maintained in position on pole 50 by locking pin 54 through hole 68 and its corresponding opposite hole.

Of course, since all the modular components are slideably mounted around pole 50, regardless of the configuration of the bird feeder unit and placement of the components, the height of the unit on the pole can be easily and simply adjusted for filling by the slideably movement of handgrip 40 over the pole onto stop support 70.

Thus, by this invention, a versatile bird feeder system is provided which allows the flexibility to interchange feeder components and, regardless of its configuration, provides a means to easily refill the feeder without the use of ladders or step stools or removing the feeder from its mounting.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A modular bird feeder system comprising:
an elongated vertically standing mounting pole having an upper end extending to a removeable roof member and a lower end, the pole being secured at its lower end to ground foundation;
a plurality of separate, independent, and adjacently aligned modular components forming a bird feeder unit, the pole extending completely through each of the components, said components comprising:
bird feed housing means removeably positioned around the pole for the storage of bird feed;
bird feed receptacle means removeably positioned around the pole for facilitating the receipt and filling of the housing means with bird feed, said bird feed receptacle means being located beneath the roof member and directly atop and mated with the bird feed housing means;
an upper feed tray removeably mounted around and slideable along the pole, said feed tray comprising an integrally extending first means located substantially at the center of the feed tray for removeably connecting an adjacent modular component;
a lower feed tray removeably mounted and slideable along the pole, said upper feed tray comprising an integrally extending second means located substantially at the center of the lower feed tray for removeably connecting two adjacent modular components;
guard means removeably mounted and slideable along the pole for protecting the bird feed from unwanted animals, said guard means comprising an integrally extending third means located substantially at the center of the guard means for removeably connecting two adjacent modular components; and
adjustment means removeably mounted and slideable along the pole for controlling the position of the bird feeder unit on the pole, said adjustment means at all times being located beneath the bird feed housing means and having fourth means for removeable connection with the center of an adjacent modular component;
whereby the bird feeder unit, with all its modular components aligned and connected, is positioned by the adjustment means at the upper end of the pole for feeding birds and, upon sliding the adjustment means downward to a lowered position on the pole, the bird feeder unit is positioned to be filled with bird feed.

2. The modular bird feeder system as in claim 1 wherein the first, second, third, and fourth means are threaded connections which are configured to be attached to the threaded connections of adjacent modular components.

3. The modular bird feeder system as in claim 1 wherein the second means comprises dual threaded connections which are each configured to be attached to adjacent modular components.

4. The modular bird feeder system as in claim 3 wherein the third means comprises dual threaded connections which are each configured to be attached to adjacent modular components.

5. The modular bird feeder system as in claim 1 wherein the third means comprises dual threaded connections which are each configured to be attached to adjacent modular components.

6. The modular bird feeder system as in claim 1 wherein the pole comprises locking means to maintain the bird feeder unit in a bird feeding position along the pole.

7. The modular bird feeder system as in claim 6 wherein the locking means is adjustable within holes along the length of the pole.

8. The modular bird feeder system as in claim 1 further comprising support means to maintain the bird feed unit in the lowered position.

9. The modular bird feeder system as in claim 1 wherein the bird feed receptacle means comprises a funnel member configured to be positioned atop the bird feed housing means, said funnel member having means to prevent weather elements from entering the funnel member.

10. A modular bird feeder system comprising:
an elongated vertically standing mounting pole having an upper end extending to a removeable roof member and a lower end, the pole being secured at its lower end to ground foundation;
a plurality of separate, independent, and adjacently aligned modular components forming a bird feeder unit, the pole extending completely through each of the modular components, said components comprising:
bird feed housing means removeably positioned around the pole for the storage of bird feed;
bird feed receptacle means removeably positioned around the pole for facilitating the receipt and filling of the housing means with bird feed, said bird feed receptacle means being located beneath the roof member and directly atop and mated with the bird feed housing means;
an upper feed tray removeably mounted around and slideable along the pole, said feed tray comprising an integrally extending first means located substantially at the center of the feed tray for removeably connecting an adjacent modular component;
a lower feed tray removeably mounted and slideable along the pole, said upper feed tray comprising an integrally extending second means located substantially at the center of the lower feed tray for removeably connecting two adjacent modular components;
guard means removeably mounted and slideable along the pole for protecting the bird feed from unwanted animals, said guard means comprising an integrally extending third means located substantially at the center of the guard means for removeably connecting two adjacent modular components; and
adjustment means removeably mounted and slideable along the pole for controlling the position of the bird feeder unit on the pole, said adjustment means at all times being located beneath the bird feed housing means and having fourth means for removeable connection with the center of an adjacent modular component;
whereby the lower feed tray is removeable from the bird feeder by disconnecting the second means from its two adjacent modular components, and the guard means is separately removeable from the bird feeder unit by disconnecting the third means from its two adjacent modular components.

11. The modular bird feeder system as in claim 10 wherein the first, second, third, and fourth means are threaded connections which are configured to be attached to the threaded connections of adjacent modular components.

12. The modular bird feeder system as in claim 10 wherein the second means comprises dual threaded connections which are each configured to be attached to adjacent modular components.

13. The modular bird feeder system as in claim 12 wherein the third means comprises dual threaded connections which are each configured to be attached to adjacent modular components.

14. The modular bird feeder system as in claim 10 wherein the third means comprises dual threaded connections which are each configured to be attached to adjacent modular components.

15. The modular bird feeder system as in claim 10 further comprising support means to maintain the bird feed unit in the lowered position.

16. The modular bird feeder system as in claim 10 wherein the bird feed receptacle means comprises a funnel member configured to be positioned atop the bird feed housing means, said funnel member having means to prevent weather elements from entering the funnel member.

17. The modular bird feeder system as in claim 10 further comprising locking means adjustable within holes along the length of the pole to maintain the bird feeder unit in positions at the upper end of the pole.

18. A modular bird feeder system comprising:
a bird feeder unit;
an elongated vertically standing mounting pole having an upper end extending to a removeable roof member and a lower end, the pole being secured at its lower end to ground foundation, said pole comprising adjustable locking means to maintain the bird feeder unit at the upper end of the pole and bird feeder unit support means to maintain the bird feeder unit in a lowered position on the pole;
the bird feeder unit comprising a plurality of separate independent modular, and adjacently aligned components, the pole extending completely through each of the modular components, said components comprising:
bird feed housing means removeably positioned around the pole for the storage of bird feed;
bird feed receptacle means removeably positioned around the pole for facilitating the receipt and filling of the housing means with bird feed, said bird feed receptacle means being located beneath the roof member and directly atop and mated with the bird feed housing means;
a feed tray removeably mounted and slideable along the pole, said feed tray comprising an integrally extending first means located substantially at the center of the feed tray for removeably connecting an adjacent modular component;
adjustment means slideable along the pole for controlling the position of the bird feeder unit on the pole, said adjustment means at all times being located beneath the bird feed housing means and having second means for removeable connection with the center of an adjacent modular component, whereby the bird feeder unit with all its modular components aligned and connected, is maintained at the upper end of the pole by the locking means for feeding birds and, upon sliding the adjustment means downward, the bird feeder unit with all its modular components aligned and connected, is maintained at said lowered position by the support means for filling the housing means with bird feed.

19. The modular bird feeder system as in claim 18 wherein the locking means comprises a resilient locking pin configured to be adjustably positioned through holes along the pole.

20. The modular bird feeder system as in claim 18 wherein the bird feed receptacle means comprises a funnel member configured to be positioned atop the bird feed housing means, said funnel member having means to prevent weather elements from entering the funnel member.

21. The modular bird feeder system as in claim 18 further comprising additional modular components removeably mounted around and slideable along the pole.

22. The modular bird feeder system as in claim 21 wherein the additional modular components comprise a lower feed tray and guard means for protecting the bird feed from unwanted animals.

* * * * *